United States Patent [19]
Bolkestein et al.

[11] Patent Number: 5,475,926
[45] Date of Patent: Dec. 19, 1995

[54] DEVICE AND METHOD FOR RIPENING FRUIT

[75] Inventors: Jacobus Bolkestein; Cornelis Bolkestein, both of Rotterdam, Netherlands

[73] Assignee: Binair Groep B.V., The Hague, Netherlands

[21] Appl. No.: 135,736

[22] Filed: Oct. 13, 1993

[30] Foreign Application Priority Data

Oct. 13, 1992 [NL] Netherlands ............................ 9201776

[51] Int. Cl.⁶ ..................................................... F26B 11/18
[52] U.S. Cl. .................................. 34/200; 62/78; 62/419; 426/418
[58] Field of Search ............................... 62/414, 419, 78; 34/200; 426/418, 419

[56] References Cited

U.S. PATENT DOCUMENTS

| | | | |
|---|---|---|---|
| 3,129,071 | 4/1964 | Meredith | 34/34 |
| 4,063,432 | 12/1977 | Chaussy et al. | 62/419 |
| 5,054,291 | 10/1991 | Davis et al. | 62/62 |

FOREIGN PATENT DOCUMENTS

| | | |
|---|---|---|
| WO8901292 | 2/1989 | WIPO. |
| WO9101094 | 2/1991 | WIPO. |

OTHER PUBLICATIONS

Brochure "The Unripe Process", Chiquita Brands International, 1990.

*Primary Examiner*—Ronald C. Capossela
*Attorney, Agent, or Firm*—Handal & Morofsky

[57] ABSTRACT

The invention relates to a device and method for ripening fruit, such as bananas, comprising a chamber containing a frame in which at least two rows of loaded pallets are placed one above the other, in such a way that there is a free space on either side of the rows of loaded pallets, and comprising cooling means for the cooling of fluid provided in the lengthwise direction along the frame, and circulation means for conveying the fluid from one longitudinal side of the frame to the other longitudinal side, in such a way that a pressure difference arises between the space at one longitudinal side and the other, as a result of which the fluid flows back essentially in the horizontal direction through the load on the pallets from one longitudinal side to the other. According to the invention, the frame is in this case such that it provides for an essentially horizontal space between the loads of two rows of loaded pallets placed one above the other, by way of which horizontal space the circulation means convey the fluid from one longitudinal side to the other longitudinal side, said horizontal space being bounded at the bottom and top side by bottom and top seals respectively, and the cooling and circulation means being disposed essentially at the level of the horizontal space.

19 Claims, 2 Drawing Sheets

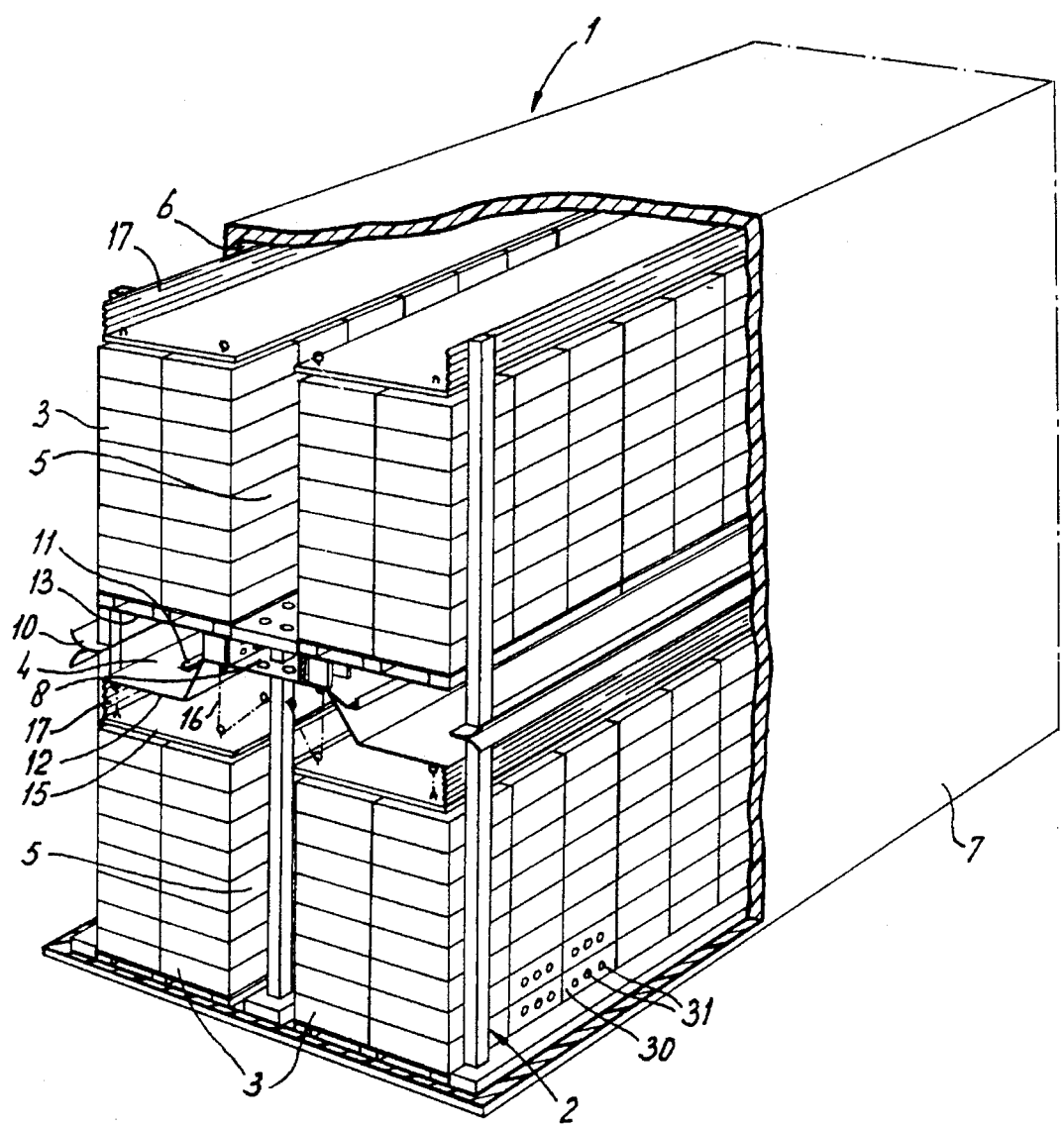

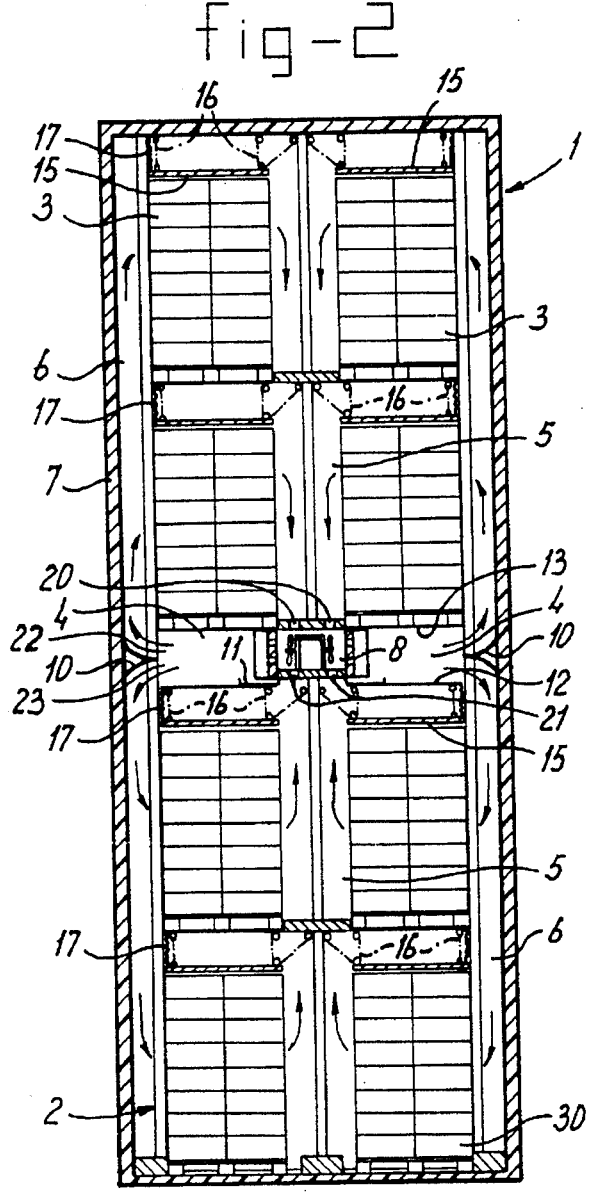
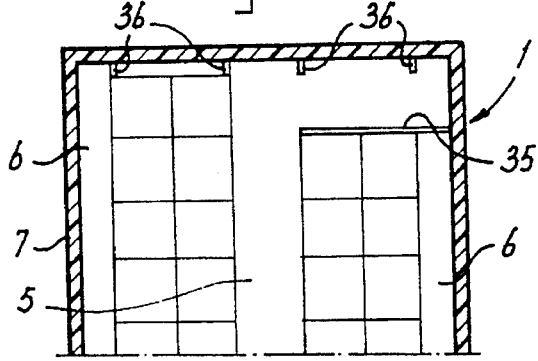

DEVICE AND METHOD FOR RIPENING FRUIT

BACKGROUND OF THE INVENTION

The present invention relates to a device for ripening fruit, such as bananas, comprising a chamber containing a frame in which at least two rows of loaded pallets are placed one above the other, in such a way that there is a free space on either side of the rows of loaded pallets, and comprising cooling means for the cooling of fluid provided in the lengthwise direction along the frame: and circulation means for conveying the fluid from one longitudinal side of the frame to the other longitudinal side, in such a way that a pressure difference arises between the space at one longitudinal side and the other, as a result of which the fluid flows back essentially in the horizontal direction through the load on the pallets from one longitudinal side to the other.

Such a device is known from a brochure dated 1990 of Chiquita® about "The Uniripe™ process" and comprises a chamber containing a frame in which four rows of loaded pallets are placed. These four rows are placed in two adjacent stacked rows, each two loaded pallet rows high, parallel to each other in such a way in the lengthwise direction in the chamber that three separate spaces are produced, i.e. on either side of the chamber a side space between the corresponding longitudinal side wall of the chamber and the stacked row placed along it (thus a total of two side spaces), and a middle space lying between the stacked rows. Cooling and circulation means are provided in the top of the chamber, above the two loaded pallet rows stacked two high, in the lengthwise direction thereof, which means suck air out of the middle space, cool it and convey it over the loaded pallet rows stacked two high and along the ceiling of the chamber to the side spaces lying at either side of the chamber. These circulation means hereby produce a pressure difference between the side spaces and the middle space, as a result of which the air flows back in the horizontal direction through the load on the pallets from the side spaces to the middle space.

This known device has the disadvantage that, as a result of the distance, determined by standard dimensions of the pallets, between the top and bottom side of the pallet row stacked two high, the flow of air through fruit at the bottom of the chamber is not as good as that through the fruit at the top of the chamber, with the result that the fruit does not ripen uniformly. Such uneven ripening is undesirable and must be limited. The parameter taken for uneven ripening is the greatest temperature difference which can be found in the air between two points in the chamber. This temperature difference must be as small as possible for arbitrary points in the chamber. This can be achieved by increasing the circulation capacity of the circulation means. The energy consumption of such a device rises considerably as a result of this. The cooling capacity is also often increased in this case, which also leads to increased energy consumption.

SUMMARY OF THE INVENTION

The object of the present invention is to offer a solution to the above problems.

This is achieved according to the invention through the fact that between the loads of two rows of loaded pallets placed one above the other the frame provides for an essentially horizontal space, through which horizontal space the circulation means convey the fluid from one longitudinal side to the other, said horizontal space being bounded at the bottom and top side by bottom and top seals respectively, and the cooling and circulation means being disposed essentially at the level of the horizontal space.

In the case of a device according to the invention the fluid is thus not conveyed over the stacked loaded pallet rows from one longitudinal side to the other longitudinal side of the row, but between the loads of two loaded pallet rows stacked above one another through an essentially horizontal space provided between the load of the bottom pallet row and the top pallet row. The seals provided at the bottom and top side of the horizontal space ensure that the fluid cannot flow directly out of the horizontal space into the loads. In this way, in the case of a pallet row stacked two rows high the flow of fluid around the fruit is more uniform, with the result that a smaller temperature difference can be achieved with the same cooling and circulation means, compared with the known device, so that the ripening is more uniform; but it is also conceivable to reduce the circulation and/or cooling capacity in a device according to the invention, compared with the known device, without the maximum temperature difference becoming greater, so that the energy consumption of a device according to the invention decreases without the ripening performances being reduced.

It is advantageous according to the invention if the device comprises sealing means which impede fluid flow between the spaces at the longitudinal sides of a loaded pallet row other than through the horizontal space, and other than horizontally through the load of the pallets. Such sealing means ensure that no stray fluid flows occur between the longitudinal sides of a loaded pallet row, which would make the ripening less controllable and less uniform.

Such sealing means according to the invention advantageously comprise an inflatable air bag. Such an air bag can be inflated with, for example, air and then sealed, or can be provided continuously with air by means of, for example, a fan, with the result that it remains in the inflated state. All passages along which no fluid flows may occur can be sealed off in a simple way with such inflatable air bags, since such bags adapt to the shape of the passage during inflation.

According to an advantageous embodiment of the invention, said sealing means comprise a vertical seal which extends in the lengthwise direction of the frame and is disposed at the top side of a loaded pallet row. Such vertical seals impede undesired fluid flow from one longitudinal side to the other along the top side of the load of a pallet row. Such a vertical seal can be an inflated air bag which is placed above the load of a pallet row. It is advantageous according to the invention in this case if such a vertical seal is fixed along its top side to the bottom seal of the horizontal space.

According to a further embodiment according to the invention, it is advantageous if said vertical seal is a flap which, is disposed at the side of a pallet row and which can be swung about a shaft extending in the lengthwise direction of the frame. Two of such flaps can be provided if necessary at the same height on either side of a pallet row. Such a flap can be fixed, for example, to the ceiling of the chamber, to the frame or to the bottom seal of a horizontal space.

It is also advantageous according to the invention if at the top side of a pallet row the sealing means also comprise an element disposed essentially horizontally and fixed to a lifting device, such as cables, which element is movable up and down by means of the lifting device, while the vertical seal can be fixed or is fixed to the element at its bottom side. Such an element can comprise, for example, a plate, while the vertical seal is, fop example, a fabric. However, it is also very conceivable for an air bag to be used for this element, in which case the vertical seal is then a part of the air bag; but the vertical seal can in this case also be a flap which is fixed to the element or can be fixed thereto in a vertical (closed) position. The element (for example, air bag or plate) is in this case movable up and down by means of the lifting device, so that the rows of loaded pallets can easily be placed under it, which facilitates the placing of the pallets loaded with fruit in the chamber. When the row of loaded pallets is placed under the element, the element is lowered onto the top of the load (in the case of an air bag the element is also inflated, and in the case of a flap as the vertical seal it is placed in a vertical closed position), so that a fluid flow through the horizontal top surface of the load is impeded. Such an element which can be moved up and down on a lifting device also makes it possible for pallet loads of differing heights to be sealed off at the top side. The vertical seal ensures in this case that the variable size of passage above the element is sealed off, so that no fluid can flow along above the element from one longitudinal side of the pallet row to the other.

It is also advantageous according to the invention if the device comprises a sealing partition which is movable in the lengthwise direction of the row of loaded pallets essentially at right angles to its sealing direction, which partition impedes fluid flow between the longitudinal sides of a loaded pallet row by way of the front or rear side of said row. With such a partition, for example an air bag, stray fluid flows along an end face of a row are impeded if, for example, the length of said row is not the same as that of other rows, or if the chamber is not completely full.

According to an advantageous embodiment of the invention, at least four loaded pallet rows can be placed above one another in the frame, in which case the frame provides for said horizontal space between the second and third pallet row. In this way the ripening capacity can be doubled in an economic way by comparison with the known device, without increasing the floor area of the chamber, and without the ripening performance being lessened. In the case of the known device, when the ripening capacity is doubled by doubling the height of the stacked rows, the great height makes it difficult now to achieve an adequate flow of air through the fruit in the bottom of the chamber. In order to achieve somewhat comparable ripening performances, the total cooling and ventilation capacity required will more than double. In the case of a device according to the invention doubling of cooling and ventilation capacity is sufficient. Even further increasing the ripening capacity by stacking the rows higher than four loaded pallets high is possible without the ripening performances being lessened, and without the necessary cooling and circulation capacity increasing uneconomically. This cannot be achieved with known devices in circumstances which are otherwise comparable.

According to a further embodiment of the invention, it is advantageous if the fluid inlet for the circulation means is divided into a first inlet for fluid coming from the top and a second inlet for fluid coming from the bottom, the fluid flows through this first and second inlet being controllable independently of each other. In this way, it is possible to control the ripening of the fruit more accurately. Moreover, it is possible with such a device to switch off, for example, the fluid inlet from the top if there is no loaded pallet row above the horizontal space, with the result that a stray fluid flow through the unfilled space for a pallet row is prevented.

The controllability of ripening and the ripening of fruit in the case of a chamber which is not full is further improved according to the invention if the fluid outlet of the circulation means is divided into a first outlet for fluid going upwards and a second outlet for fluid going downwards, the fluid flows through these first and second outlets being controllable independently of each other.

The controllability of ripening and the ripening of fruit in the case of a chamber which is not full is further improved according to the invention if the fluid flows through the horizontal space, viewed in the lengthwise direction of the frame, are controllable depending on position.

It is also advantageous according to the invention if the cooling and/or circulation means Can be switched on and off depending on position, viewed in the lengthwise direction of the frame. This makes it possible to save energy when the chamber is not completely full.

In the case of a device where two rows of loaded pallets are to be placed next to each other in the chamber with a vertical space between them, it is advantageous according to the invention if the frame is formed in such a way that lit provides for a horizontal space in both rows, these horizontal spaces lying essentially at the same height. In the case of such a device the cooling and circulation means can advantageously be placed at the level of the horizontal space between the two adjacent rows. The vertical Space between the adjacent rows is then the space at one longitudinal side. The fluid flows through loads of adjacent rows of loaded pallets are then in opposite directions. The same applies to the fluid flows through the horizontal spaces.

The invention also relates to a method for ripening fruit, such as bananas, in which at least two rows of loaded pallets are placed one above the other in a chamber, in which fluid is cooled and circulated, and in which a pressure difference between the longitudinal sides of the rows of loaded pallets is produced, as a result of which the fluid is forced to flow in an essentially horizontal direction from one longitudinal side to the other through the load of the pallets. According to the invention, such a method is very advantageously carried out if the loaded pallets are placed in the chamber in such a way that the loads of two pallets with an essentially horizontal space between them are placed one above the other, while the fluid is conveyed through the horizontal space from one longitudinal side to the other, the fluid being cooled during this conveyance.

BRIEF DESCRIPTION OF THE DRAWING

The invention will now be explained in greater detail below with reference to a drawing in which, by way of example, a number of embodiments of a device according to the invention are shown. In the drawing:

FIG. 1 shows a partially cut-away diagrammatic view in perspective of a device according to the invention;

FIG. 2 shows a diagrammatic vertical cross-section of another device according to the invention; and FIG. 3 shows a diagrammatic detail of a horizontal cross-section of a device according to,the invention.

DETAILED DESCRIPTION OF THE EMBODIMENTS

FIG. 1 shows a chamber 1 containing a frame 2. This chamber 1 contains a total of four rows 3 of loaded pallets. These rows 3 are placed next to each other in the Chamber in stacks two rows high. Between the loads of two rows of pallets placed one above the other, an essentially horizontal space 4 is provided in each stack by the frame 2. These horizontal spaces 4 are at the same height, and each is bounded at its bottom and top side by bottom sealing plates 12 and top sealing plates 13 respectively. A vertical space 5 is present between two adjacent rows of loaded pallets. For two adjacent rows of loaded pallets, this vertical space 5 forms a common so-called "space at one longitudinal side of a row of loaded pallets". The rows of loaded pallets are also placed in the chamber in such a way that a vertical side space 6 is left at both sides of the chamber between the loads and the side walls 7. For the adjacent load in question, these side spaces 6 form the so-called space at the other longitudinal side of a row of loaded pallets.

The cooling and circulation means 8 are provided between the horizontal spaces 4 and in the vertical space 5, in such a way that they, as it were, form an intermediate piece which separates the vertical space into two separate spaces one above the other.

FIG. 2 shows in diagrammatic form a vertical cross-section of a device according to the invention for ripening eight loaded pallet rows stacked in two stacks of four. In the case of this device the horizontal spaces 4 are provided between the second and third loads of each stack. Spaces are also provided between the other loads, but no horizontal fluid flow is possible through them in the transverse direction of the chamber, as a result of the vertical seals 17.

The intermediate piece 8 formed by the cooling and circulation means is preferably (FIG. 2) provided with a first inlet 20 for fluid flowing from the top and a second inlet 21 for fluid flowing from the bottom, the fluid flows through these inlets 20, 21 being controllable independently of each other. This can be achieved by, for example, designing the inlets 20 and 21 in the form of a series of openings 20 and 21 which are disposed in the lengthwise direction of the chamber 1, and the size of passage of which can be varied by sliding a slide (not shown).

In a corresponding manner, each side space 6 is provided at the level of the horizontal space 4 with an intermediate piece 10 which divides the side space 6 in question into two separate spaces, a top and a bottom space. Below and above this intermediate piece 10 are outflow openings 22 and 23 (a first outlet 22 for upgoing fluid and a second outlet 23 for downgoing fluid respectively), the size of passage of which is preferably variable, fop example by means of a slide (not shown).

The above-mentioned slides (not shown) are preferably formed in such a way that the fluid flows through the horizontal space 4 are controllable depending on position, viewed in the lengthwise direction of the chamber 1. If one of mope slides completely shut off the passage locally, it is very practical in terms of energy saving if the cooling and circulation means 8 can be switched off at the position in question, thus can also be switched off depending on position.

A horizontal plate 15, suspended from cables 16, is disposed at the top side of each pallet row 3. The plates 15 are of such dimensions that they completely cover the load lying below them, in such a way that no fluid can flow along them into or out of the load. By means of the cables 16 (which in FIG. 1 are not shown in the case of the plates on the top loads), these plates 15 can be moved up and down, which facilitates filling of the chamber 1 with loaded pallets 3, and allows filling of the chamber 1 with differently loaded pallets 3. In order to ensure that, irrespective of the height at which the plates 15 are situated, no horizontal fluid flow at right angles to the lengthwise direction of the chamber 1 along the top of said plates 15 is possible, vertical seals 17 are fixed thereto. These vertical seals 17 are made of, for example, fabric. These vertical seals 17, extending in the lengthwise direction of the chamber 1, can in principle be fixed at any desired place on the top side of the plates 15. The vertical seals 17, which are not situated directly below a horizontal space 4, are fixed by their top side to the ceiling of the chamber 1 or the frame 2, and the vertical seals 17 situated directly below the horizontal spaces 4 are fixed to the bottom cover plate 13 of the horizontal space 4.

FIG. 1 also shows drains 11 fitted in the horizontal space 4 for collecting and discharging condensate.

The way in which the device according to the invention works will now be described with reference to FIG. 2, in which the flow of the fluid is indicated by means of arrows.

The pallets are loaded with boxes of fruit, holes 31 (only partially shown in FIG. 1) being provided in the sides of the boxes parallel to the side walls 7 of the chamber.

The cooling and circulation means 8 suck up the fluid from the vertical space 5, both from the top through inlet openings 20 and from the bottom through inlet openings 21. They cool the fluid and convey it in a horizontal direction to the side walls of the chamber. By way of outlet openings 22 and 23, the fluid is then blown on either side of the chamber into the spaces 6 along the side walls 7. The fluid then spreads through the spaces 6, and subsequently flows back in the horizontal direction through the holes 31 in the boxes of the load on the pallets to the vertical space 5. The circulation means produce this flow preferably by means of fans, by means of which a pressure difference is produced between the vertical space 5 and the side spaces 6. For uniform and efficient ripening of the fruit, it is important that the device should have adequate sealing means which impede fluid flow between the spaces at the longitudinal sides of a loaded pallet row, other than through the horizontal space and other than horizontally through the load of the pallets. Due to the fact that the circulation means suck up fluid in the vertical direction from the interspace over the full length of the chamber and convey it at right angles thereto to the side spaces, the flow of fluid through the load on the pallets is very uniform.

Through the selective sealing off of inlet openings (20 and 21) and/or outlet openings (22 and 23) of the cooling and circulation means 8, it is possible to ripen the fruit therein uniformly when the chamber 1 is only partially full. If a row is not completely full of pallets, as shown in FIG. 3, fluid flow along the end of this row can be prevented by means of, for example, a partition 35 which is movable in the lengthwise direction of the chamber. Seals 36, which in the case of a completely full row of loaded pallets impede flow along the end of a row, are also shown in FIG. 3.

It will be clear to an average person skilled in the art that many modifications and variations can be made within the scope of the invention to the examples of embodiments shown, for example:

the fluid used, which is preferably air, can also be another fluid;

the rows of pallets can in principle be made of unlimited length;

the stacks can in principle be made of unlimited height by providing sufficient horizontal spaces with cooling and circulation means between loads of different rows placed one above the other;

in principle, an unlimited number of stacks can be placed next to one another;

the vertical seals 17 can be of a harmonica-type folding/unfolding construction;

the vertical seals 17 and possibly also the plates 15 can easily be replaced by flaps;

the vertical seals 17 and plates 15 can very advantageously be replaced by inflatable air bags which are provided between the loads and the bottom sealing plates 12 or the ceiling of the chamber;

the seals 36 can be replaced by inflatable air bags; and the partition 35 can be replaced by an inflatable air bag which is placed between the load and the side wall of the chamber.

We claim:

1. Method for ripening fruit, such as bananas, in which at least two rows of loaded pallets are placed one row above another in a chamber and defining a generally horizontal space between said one and other rows, in which fluid is cooled and circulated by cooling and circulation means disposed essentially at the level of said horizontal space, and in which a pressure difference between the longitudinal sides of said rows of loaded pallets is produced, as a result of which said fluid is forced to flow in an essentially horizontal direction from one longitudinal side to the other through said load of pallets, wherein said loaded pallets are placed in said chamber in such a way that said loads of two pallets are placed one above the other with an essentially horizontal space between said loads, said fluid being conveyed through said horizontal space from said one longitudinal side to said other longitudinal side, said fluid being cooled during this conveyance.

2. A device for ripening fruit comprising:

a) a chamber;

b) a frame contained within said chamber;

c) at least two rows of loaded pallets supporting air-permeable loads of fruit contained within said frame wherein said pallets are placed one above the other to produce a free space on either side of Said rows of loaded pallets and wherein said frame provides for an essentially horizontal space between said rows Of loaded pallets;

d) a bottom sealing plate and a top sealing plate, wherein said horizontal space is bounded by said sealing plates to prevent fluid flow directly out of said horizontal space into said loads;

e) a vertical space at one longitudinal side formed by two adjacent rows of said loaded pallets;

f) a vertical space at the Other longitudinal side formed by the opposite face of said loaded pallets and the inner surface of said frame;

g) a cooling means disposed longitudinally, essentially at the level of said horizontal space for the cooling of fluid; and h) a circulation means disposed longitudinally, essentially at the level of said horizontal space for conveying said cooled fluid from one longitudinal side of said frame to the other whereby said fluid flows back essentially in the horizontal direction through said load on the pallets from said one longitudinal side to said other longitudinal side:

whereby said device is operable to ripen fruit uniformly.

3. A device according to claim 2 further comprising a sealing means between said free side spaces to prevent horizontal fluid flow through the spaces in the transverse direction of said chamber, other than through said pallet loads.

4. A device according to claim 3, wherein said sealing means comprises an inflatable air bag provided between said loads and said bottom sealing plate.

5. A device according to claim 3, wherein said sealing means further comprises a vertical seal extending in said lengthwise direction of said frame and disposed at a top side of one of said loaded pallet rows.

6. A device according to claim 5, wherein said vertical seal is fixed along its top side to said bottom seal of said horizontal space.

7. A device according to claim 5, where said vertical seal is fixed to said element at its bottom side.

8. A device according to claim 5, wherein said vertical seal comprises a flap disposed at the side of a pallet row and which can be swung about a shaft extending in said lengthwise direction of said frame.

9. A device according to claim 5, wherein said sealing means further comprises:

i) a horizontal plate at the top side of one of said pallet rows wherein said horizontal plate; and j) a lifting device wherein said horizontal plate is fixed to said lifting device whereby said element is movable by said lifting device.

10. A device according to claim 9, wherein said lifting device comprises cables extending from said horizontal plate.

11. A device according to claim 3, wherein said sealing means comprise a partition movable in the lengthwise direction of said rows of loaded pallets essentially perpendicularly to its sealing direction, whereby said partition impedes fluid flow between said longitudinal sides of a loaded pallet row by way of the front or rear side of said row.

12. A device according to claim 2, wherein at least four loaded pallet rows are placed one above the other in said frame said horizontal space being located between two inside rows.

13. A device according to claim 2, wherein at least two pallet lines, each comprising at least two rows of loaded pallets, are placed next to each other in said chamber with a vertical space between said lines, whereby the frame provides for horizontal space in both said lines, and wherein said horizontal spaces are essentially at the same height.

14. A device according to claim 2, comprising an intermediate piece disposed along said frame in the lengthwise direction wherein said space at a longitudinal side of the frame is divided into two separate spaces at the level of said horizontal space by means of said intermediate piece.

15. A device according to claim 2, wherein said circulation means comprises:

k) a first inlet for fluid flow from the top of said pallet rows;

l) a second inlet for fluid flow from the bottom of said pallet rows;

m) a first outlet for upwardly flowing fluid;

n) a second outlet for downwardly flowing fluid;

wherein the fluid flows are independently controllable of each other.

16. A device according to claim 15 further comprising a flow-control slide wherein said inlets comprise a series of openings disposed in the lengthwise direction of said chamber and whereby the aperturing of said openings is controlled by sliding said slide.

17. A device according to claim 16, comprising a plurality of said flow-control slides and inlets wherein said slides are formed so that the fluid flows through said horizontal space are controllable depending on position, viewed in the lengthwise direction of said frame.

18. A device according to claim 16, wherein said slide and openings are operable to shut off fluid flow locally in sections whereby one or more slides can be operated to shut off unfilled sections of said pallet rows to provide uniform ripening of partially filled chambers.

19. A device for ripening fruit in a chamber comprising:
 a) a frame containable within said chamber, said frame being adapted to support at least two rows of pallets bearing air-permeable loads of fruit, said rows extending in a longitudinal direction and being disposed one above the other and defining a free fluid flow space on either side of said rows of pallets and an essentially horizontal space between said rows of pallets;
 b) a bottom sealing member and a top sealing member bounding said horizontal space prevent fluid flow directly from said horizontal space into said loads;
 c) fluid cooling and circulating means disposed in said frame essentially at the level of said horizontal space and extending in said longitudinal direction; whereby cooling fluid can be circulated to flow back essentially in the horizontal direction through said loads of fruit from one longitudinal side of a row to the other longitudinal side to promote uniform cooling of said loads of fruit.

\* \* \* \* \*